US012804007B2

(12) United States Patent
Kumar et al.

(10) Patent No.: US 12,804,007 B2
(45) Date of Patent: Nov. 17, 2026

(54) PREDICTING ZERO-DAY VULNERABILITIES USING ANOMALY DETECTION AND NEURAL NETWORK ALGORITHMS

(71) Applicant: Bank of America Corporation, Charlotte, NC (US)

(72) Inventors: Abhay Kumar, Gurugram (IN); Karen Ashley Frye, Charlotte, NC (US); Krishna Sattiraju, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 18/937,917

(22) Filed: Nov. 5, 2024

(65) Prior Publication Data

US 2026/0129064 A1 May 7, 2026

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC ........................ H04L 63/1433; H04L 63/1425
See application file for complete search history.

(56) References Cited

U.S. PATENT DOCUMENTS

| | | | | |
|---|---|---|---|---|
| 8,621,618 | B1 * | 12/2013 | Ramsey | G06F 21/554<br>713/153 |
| 9,332,023 | B1 * | 5/2016 | Wang | H04L 63/145 |
| 11,082,441 | B1 * | 8/2021 | Bouguerra | H04L 9/3247 |

(Continued)

FOREIGN PATENT DOCUMENTS

| | | |
|---|---|---|
| CN | 106411937 B | 12/2017 |

OTHER PUBLICATIONS

Satam SS, Patil AA, Narkhede DB, Singh S, Pulgam N. Zero-day attack detection and prevention. In2023 7th International Conference on Computing, Communication, Control and Automation (ICCUBEA) Aug. 1, 20238 (pp. 1-6). IEEE. (Year: 2023).*

*Primary Examiner* — Trang T Doan
*Assistant Examiner* — Ethan V Vo
(74) *Attorney, Agent, or Firm* — Banner & Witcoff, Ltd.

(57) ABSTRACT

Aspects related to predicting zero-day vulnerabilities using anomaly detection and neural network algorithms are provided. A prediction platform may train an unsupervised algorithm for identifying suspicious packets and a prediction model for generating suspicion scores and behavior patterns based on network traffic information. The platform may segment information of packets of network traffic information into a plurality of segments. The platform may compare the segments with zero-day vulnerability information to identify known zero-day vulnerabilities. The platform may use the unsupervised algorithm to identify suspicious packets that do not correspond to known zero-day vulnerabilities. The platform may generate suspicion scores and behavior patterns for suspicious packets. The platform may further train the prediction model based on behavior patterns associated with certain suspicion scores to generate vulnerability scores. The platform may generate vulnerability scores for suspicious packets using the model. The platform may output zero-day vulnerability predictions based on the vulnerability scores.

20 Claims, 10 Drawing Sheets

(56) References Cited

U.S. PATENT DOCUMENTS

| | | | |
|---|---|---|---|
| 11,949,701 | B2 | 4/2024 | Bertiger et al. |
| 12,015,629 | B2 | 6/2024 | Shao et al. |
| 12,034,756 | B2 | 7/2024 | Busany et al. |
| 12,039,455 | B2 | 7/2024 | Scheideler et al. |
| 12,069,082 | B2 | 8/2024 | Shao et al. |
| 12,131,294 | B2 | 10/2024 | van Rotterdam et al. |
| 2017/0099312 | A1* | 4/2017 | Ganame ................. G06N 20/00 |
| 2021/0243226 | A1* | 8/2021 | El Gamal ................ G06N 3/04 |
| 2021/0359977 | A1* | 11/2021 | Paranjpe ................ G06N 20/00 |
| 2022/0060491 | A1* | 2/2022 | Achleitner .......... H04L 63/1425 |
| 2023/0049789 | A1* | 2/2023 | Seletskiy .............. G06F 21/577 |
| 2024/0022600 | A1 | 1/2024 | Zhang et al. |
| 2024/0106844 | A1* | 3/2024 | Chen ................... H04L 63/1425 |
| 2024/0146747 | A1 | 5/2024 | Zaytsev et al. |
| 2024/0223592 | A1 | 7/2024 | Bazalgette et al. |
| 2024/0223596 | A1 | 7/2024 | Sellars et al. |
| 2024/0224040 | A1 | 7/2024 | Madi et al. |
| 2024/0244070 | A1 | 7/2024 | Mohapatra et al. |
| 2024/0250963 | A1* | 7/2024 | Freitas De Araujo Filho ............. H04L 63/1416 |
| 2024/0250975 | A1 | 7/2024 | Pourahmadi et al. |
| 2024/0265465 | A1 | 8/2024 | Thompson |
| 2024/0283808 | A1 | 8/2024 | Thompson et al. |
| 2024/0283811 | A1 | 8/2024 | Thompson |
| 2024/0305664 | A1 | 9/2024 | McCarthy et al. |
| 2024/0333743 | A1 | 10/2024 | Bazalgette et al. |
| 2024/0338438 | A1 | 10/2024 | Yen et al. |
| 2025/0385928 | A1* | 12/2025 | Soryal ................. H04L 63/1425 |

* cited by examiner

PREDICTING ZERO-DAY VULNERABILITIES USING ANOMALY DETECTION AND NEURAL NETWORK ALGORITHMS

BACKGROUND

Aspects described herein are related to predicting zero-day vulnerabilities using anomaly detection and neural network algorithms. In some instances, entities such as an enterprise organization (e.g., a financial institution, and/or other institutions) may maintain cybersecurity systems and/or policies configured to protect certain information managed by, for example, the enterprise organization. However, conventional cybersecurity systems remain susceptible to threat actors taking advantage of vulnerabilities. Some of these vulnerability may be zero-day vulnerabilities, meaning that the enterprise organization has zero days to fix the vulnerability once it is identified. Zero-day vulnerabilities may be present in an operating system, web browser, application, open-source component, firmware, and/or other elements of a system associated with an enterprise organization. Conventional cybersecurity systems lack a specific mechanism and/or methodology to reliably and accurately predict these various potential zero-day vulnerabilities before they are used by threat actors, increasing the strain zero-day vulnerabilities impose upon systems managed by the enterprise organization. Accordingly, there exists a need for an effective and reliable system for predicting zero-day vulnerabilities in systems such as those managed by an enterprise organization.

SUMMARY

Aspects of the disclosure provide effective, efficient, scalable, and convenient technical solutions that address and overcome the technical problems associated with current methods of responding to zero-day vulnerabilities. In accordance with one or more arrangements of the disclosure, a computing platform with at least one processor, a communication interface, and memory storing computer-readable instructions may train a prediction model based on an object recognition algorithm. The computing platform may train the prediction model to output suspicion scores and behavior patterns based on input of packets of network traffic information. The computing platform may receive a plurality of packets of network traffic information filtered by an intrusion detection system. The computing platform may identify, by comparing the plurality of segments with historical zero-day vulnerability information, whether the first packet matches a known zero-day vulnerability. In response, the computing platform may, based on identifying that the first packet matches a known zero-day vulnerability, output a security alert and, based on identifying that the first packet does not match a known zero-day vulnerability, preserve the first packet as a potential new zero-day vulnerability. The computing platform may generate, based on preserving the first packet and by inputting the first packet into the prediction model, a suspicion score and a behavior pattern for the first packet. The computing platform may identify whether the suspicion score for the first packet satisfies a threshold score. Based on identifying that the suspicion score satisfies the threshold score, the computing platform may train, based on the behavior pattern for the first packet, the prediction model to generate vulnerability scores for packets of network traffic information. Based on identifying that the suspicion score does not satisfy the threshold score, the computing platform may store the first packet with a suspicious packet identifier. The computing platform may generate, by inputting a second packet of the plurality of packets into the prediction model, a vulnerability score for the second packet. The computing platform may output, based on the vulnerability score, a zero-day vulnerability prediction.

In one or more examples, the computing platform may train, based on the historical zero-day vulnerability information, an unsupervised anomaly detection algorithm to generate vulnerability indicators based on input of packets of network traffic information. The computing platform may generate, based on the plurality of segments and using the unsupervised anomaly detection algorithm, a vulnerability indicator for the first packet indicating a likelihood of the first packet corresponding to a known zero-day vulnerability. The computing platform may identify whether the first packet matches a known zero-day vulnerability by comparing the vulnerability indicator to a threshold likelihood. Based on identifying that the vulnerability indicator meets or exceeds the threshold likelihood, the computing platform may identify that the first packet matches a known zero-day vulnerability. Based on identifying that the vulnerability indicator does not meet or exceed the threshold likelihood, the computing platform may identify that the first packet does not match a known zero-day vulnerability.

In one or more arrangements, the object recognition algorithm may comprise an input layer configured to convert segments of network traffic information into numerical values. The object recognition algorithm may also comprise a pattern layer configured to generate, based on the converted segments of network traffic information, the behavior patterns. The object recognition algorithm may also comprise an output layer configured to output, based on the behavior patterns, the suspicion scores and the behavior patterns. In one or more examples, the historical zero-day vulnerability information may comprise one or more of: information indicating a location of a historical zero-day vulnerability, information indicating a behavior pattern associated with a historical zero-day vulnerability, or information indicating a type of threat associated with a historical zero-day vulnerability.

In one or more arrangements, the computing platform may preserve the first packet by generating the suspicious packet identifier for the first packet. In one or more examples, the computing platform may identify, based on outputting the zero-day vulnerability prediction, a solution action for the zero-day vulnerability prediction. The computing platform may implement, based on identifying the solution action, the solution action. The computing platform may update, based on the zero-day vulnerability prediction, the prediction model.

In one or more arrangements, the computing platform may segment the information of the first packet by generating, by converting the network traffic information filtered by the intrusion detection system from a first format to a second format configured for the object recognition algorithm, a first segment of the plurality of segments. The computing platform may segment the information of the first packet by generating, by preprocessing raw network traffic information and converting it to the second format, a second segment of the plurality of segments. In one or more examples, the computing platform may output the zero-day vulnerability prediction by causing display, at a user device, of a user interface comprising the zero-day vulnerability prediction.

In one or more arrangements, the zero-day vulnerability prediction may comprise one or more of: an indication of a source of a predicted zero-day vulnerability, an indication of a type of threat associated with a predicted zero-day vulnerability, or an indication of a solution action associated with a predicted zero-day vulnerability. In one or more examples, the computing platform may identify, by comparing the vulnerability score to a threshold score, whether the vulnerability score satisfies the threshold score. The computing platform may generate, based on identifying whether the vulnerability score satisfies the threshold score, the zero-day vulnerability prediction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
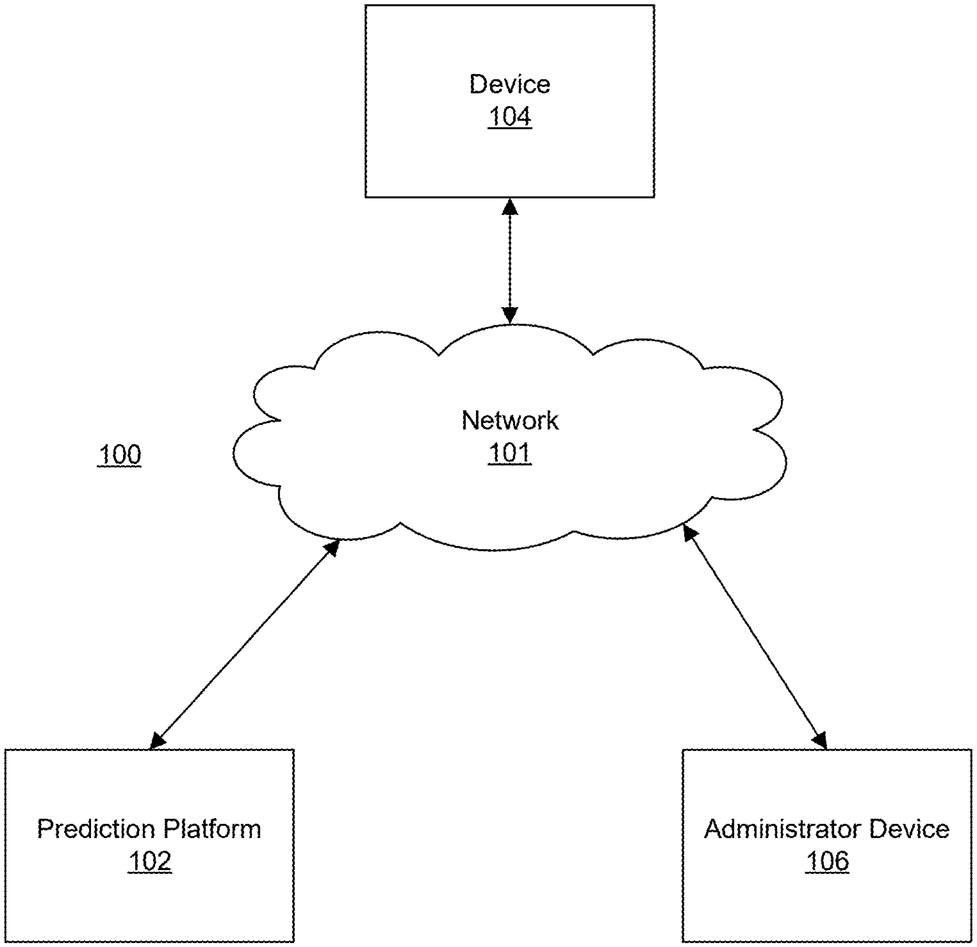
FIGS. 1A-1B depict an illustrative computing environment for predicting zero-day vulnerabilities using anomaly detection and neural network algorithms in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to predicting zero-day vulnerabilities using anomaly detection and neural network algorithms. In some instances, entities such as an enterprise organization (e.g., a financial institution, and/or other institutions) may maintain cybersecurity systems and/or policies configured to protect certain information managed by, for example, the enterprise organization. Conventional cybersecurity systems and/or policies lack a means of reliably and accurately predicting zero-day vulnerabilities before the vulnerabilities are used by threat actors, as described herein.

Accordingly, in some instances, entities such as an enterprise organization (e.g., a financial institution, and/or other organizations/institutions) may deploy, maintain, and/or otherwise utilize a prediction platform leveraging multiple technologies (e.g., anomaly detection, unsupervised algorithms, neural network algorithms, and/or other technologies described herein) to provide improvements to the accuracy and reliability of zero-day vulnerability prediction. The prediction platform may utilize network traffic information captured and filtered through an intrusion detection system (IDS) configured to detect known vulnerabilities in systems, applications, or the like managed by an enterprise organization. The network traffic information (e.g., packets) may be extracted and/or otherwise segmented into different segments. For example, the network traffic information may be segmented into three different segments: a packet extraction segment, a data processing segment, and an anomaly detection segment. The prediction platform may apply an unsupervised anomaly detection algorithm to one or more of the segments to identify early suspicious information comprising indicators/signs of system malfunctions, breaches, security gaps, or the like that may be susceptible to zero-day vulnerabilities. The identified suspicious information may be packet matched against pre-recorded vulnerabilities (e.g., historical zero-day vulnerabilities) to identify whether the information matches any known zero-day vulnerabilities. Suspicious information that does not match any pre-recorded vulnerabilities may be sent to a second level of testing. For example, the prediction platform may integrate a prediction model comprising one or more neural network algorithms. The prediction model may utilize object recognition and/or pattern recognition algorithms to identify behavioral patterns from the suspicious information and train itself to generate zero-day vulnerability predictions, based on the patterns.

By performing the functions described above, the prediction platform described herein may provide a number of benefits over conventional systems. By utilizing an IDS and an anomaly detection algorithm together before applying the neural network algorithms, the prediction platform may provide a number of preliminary checks for zero-day vulnerabilities, increasing the reliability of the prediction platform by ensuring it is not limited to a single point of failure. Additionally, the prediction platform may provide improvements to the effectiveness of zero-day vulnerability prediction by training and dynamically updating a prediction model comprising neural network algorithms in real time. The use of such a model together with the unsupervised anomaly detection algorithm (which reduces the risk of error in preliminary analysis, by removing the risk of human error) and the IDS provides for improved training of the prediction model, increasing the likelihood of the prediction model accurately identifying zero-day vulnerabilities before they occur.

In some examples, in performing the methods of deploying and/or utilizing the prediction platform as described herein, the prediction platform may train one or more machine learning models. For example, the prediction platform may train the prediction model as described herein based on an object recognition algorithm (e.g., by applying the object recognition algorithm to suspicious information that corresponds to known zero-day vulnerabilities). Training the prediction model my cause the prediction model to output indicators of suspicious information (e.g., suspicion scores) and behavior patterns based on input of packets of network traffic information. The prediction model may be further trained based on behavior patterns to generate vulnerability scores indicating a likelihood of information of a packet being a zero-day vulnerability. The prediction platform may utilize vulnerability scores generated by the prediction model to output zero-day vulnerability predictions.

These and various other aspects will be discussed more fully herein.

Figure 1B:
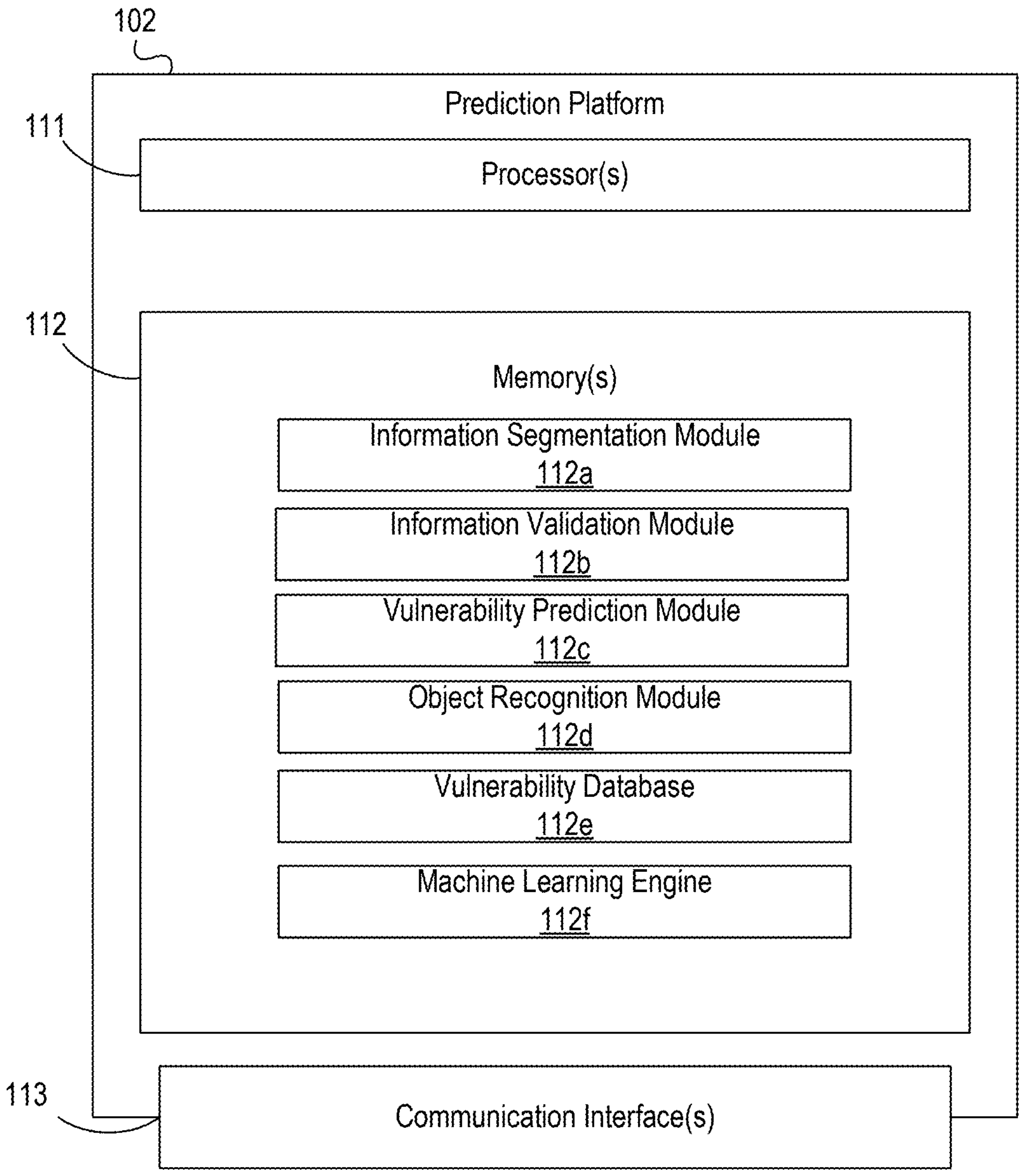

FIGS. 1A-1B depict an illustrative computing environment for predicting zero-day vulnerabilities using anomaly detection and neural network algorithms in accordance with one or more example arrangements. Referring to FIG. 1A, computing environment 100 may include one or more computer systems. For example, computing environment 100 may include a prediction platform 102, a device 104, an administrator device 106, and/or other computer systems.

As described further below, prediction platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., a prediction model, such as a neural artificial algorithm, an unsupervised anomaly detection algorithm, and/or other models). For example, the prediction platform 102 may train a prediction model to output suspicion scores and behavior patterns based on input of packets of network traffic information, and/or perform other functions described herein. The prediction platform 102 may be managed by and/or otherwise associated with an enterprise organization (e.g., a financial institution, and/or other institutions) that may, e.g., be associated with one or more additional systems (e.g., device 104, administrator device 106, and/or other systems). In one or more instances, the prediction platform 102 may be configured to communicate with one or more systems (e.g., device 104, administrator device 106, and/or other systems) to perform an information transfer, train machine learning models, generate suspicion scores and behavior patterns, generate vulnerability scores, output zero-day vulnerability predictions, and/or perform other functions.

The device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices (e.g., packets of network information, and/or other information) and/or perform other functions. In some examples, the device 104 may be a device hosting and/or otherwise associated with in intrusion detection system configured to monitor network traffic for policy violations and/or malicious activity. In some examples, the device 104 may be associated with a particular user (e.g., an employee of the enterprise organization).

The administrator device 106 may be a computing device (e.g., laptop computer, desktop computer, mobile device, tablet, smartphone, server, server blade, and/or other device), system of devices, and/or other data storing or computing component (e.g., processors, memories, communication interfaces, databases) that may be used to transfer information (e.g., proposed solution actions, responses to zero-day vulnerability predictions, and/or other information) between devices and/or perform other functions. In some examples, the administrator device 106 may be associated with a particular entity and/or organization (e.g., financial institutions, administrative/regulatory entities, and/or other entities/organizations). In some instances, the administrator device 106 may be configured to communicate with one or more systems (e.g., prediction platform 102, and/or other systems) as part of proposing a solution action, storing records of suspicious packets, receiving zero-day vulnerability predictions, and/or performing other functions. In some instances, the administrator device 106 may include, and/or correspond to a security operations center (SOC). In some instances, the administrator device 106 may be configured to display one or more graphical user interfaces (e.g., vulnerability prediction interfaces, and/or other interfaces).

Computing environment 100 also may include one or more networks, which may interconnect prediction platform 102, device 104, and administrator device 106. For example, computing environment 100 may include a network 101 (which may interconnect, e.g., prediction platform 102, device 104, and administrator device 106).

In one or more arrangements, prediction platform 102, device 104, and administrator device 106, may be any type of computing device capable of sending and/or receiving requests and processing the requests accordingly. For example, prediction platform 102, device 104, administrator device 106, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of prediction platform 102, device 104, and administrator device 106 may, in some instances, be special-purpose computing devices configured to perform specific functions.

Referring to FIG. 1B, prediction platform 102 may include one or more processors 111, memory 112, and communication interface 113. A data bus may interconnect processors 111, memory 112, and communication interface 113. Communication interface 113 may be a network interface configured to support communication between prediction platform 102 and one or more networks (e.g., network 101, or the like). Communication interface 113 may be communicatively coupled to the processors 111. Memory 112 may include one or more program modules having instructions that, when executed by processors 111, cause prediction platform 102 to perform one or more functions described herein, and/or one or more databases (e.g., a vulnerability database **112*e*, or the like) that may store and/or otherwise maintain information which may be used by such program modules and/or processors 111. In some instances, the one or more program modules and/or databases may be stored by and/or maintained in different memory units of prediction platform 102 and/or by different computing devices that may form and/or otherwise make up prediction platform 102. For example, memory 112 may have, host, store, and/or include an information segmentation module 112*a*, an information validation module 112*b*, a vulnerability prediction module 112*c*, an object recognition module 112*d*, a vulnerability database 112*e*, a machine learning engine 112*f***, and/or other modules and/or databases.

Information segmentation module **112*a* may have instructions that direct and/or cause prediction platform 102 to receive filtered packets and raw network traffic information, segment information, and/or perform other functions. Information validation module 112*b* may have instructions that direct and/or cause prediction platform 102 to identify matches between packets and known vulnerabilities, output alerts for known vulnerabilities, preserve packets, and/or perform other functions. Vulnerability prediction module 112*c* may have instructions that direct and/or cause prediction platform 102 to use one or more machine learning techniques to generate suspicion scores and behavior patterns for packets, output zero-day vulnerability predictions, implement solution actions, and/or perform other functions. Object recognition module 112***d* may have instructions that direct and/or cause prediction platform 102 to generate vulnerability scores, identify whether vulnerability scores satisfy thresholds, and/or perform other functions. Vulnerability database 112*e* may have instructions causing prediction platform 102 to store (e.g., in memory 112) correlations used to train machine learning models, segmented packet information, suspicious packets and identifiers, known vulnerabilities, and/or other information. Machine learning engine 112*f* may have instructions to train, implement, and/or update one or more machine learning models, such as a prediction model, an unsupervised anomaly detection algorithm, and/or other machine learning models.

Figure 2A:
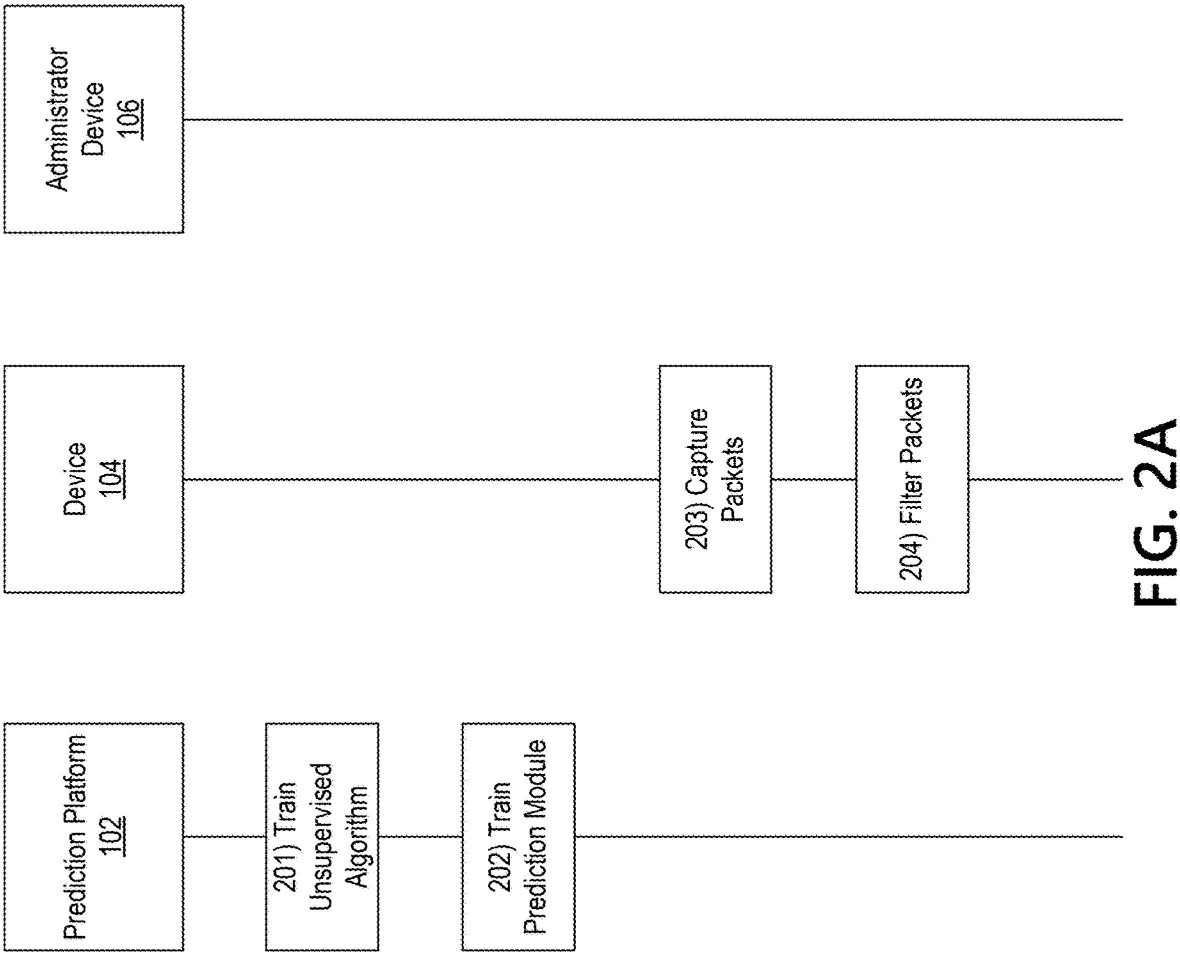
FIGS. 2A-2F depict an illustrative event sequence for predicting zero-day vulnerabilities using anomaly detection and neural network algorithms in accordance with one or more example arrangements.

FIGS. 2A-2F depict an illustrative event sequence for predicting zero-day vulnerabilities using anomaly detection and neural network algorithms in accordance with one or more example arrangements. Referring to FIG. 2A, at step 201, the prediction platform 102 may train and/or otherwise configure an unsupervised algorithm. For example, the prediction platform 102 may train and/or otherwise configure, using the machine learning engine 112*f* and based on historical zero-day vulnerability information, an unsupervised anomaly detection algorithm. The unsupervised anomaly detection algorithm may be and/or include an algorithm utilizing one or more unsupervised machine learning techniques (e.g., principal component analysis, hierarchical clustering, K-means clustering, and/or other unsupervised techniques, and/or other techniques). The historical zero-day vulnerability information may comprise unlabeled information (e.g., information indicating a location of a historical zero-day vulnerability, such as a geographic location, a network location, and/or other locations, information indicating a behavior pattern associated with a historical zero-day vulnerability, information indicating a type of threat associated with a historical zero-day vulnerability, and/or other information). The prediction platform 102 may train and/or otherwise configure the unsupervised anomaly detection algorithm by providing the unlabeled historical zero-day vulnerability information as input.

In training and/or otherwise configuring the unsupervised anomaly detection algorithm, the prediction platform 102 may train and/or otherwise configure the unsupervised anomaly detection algorithm to segment information, generate vulnerability indicators, and/or perform other functions based on input of packets of network traffic information. For example, in training and/or otherwise configuring the unsupervised anomaly detection algorithm based on the unlabeled historical zero-day vulnerability information, the prediction platform 102 may cause the unsupervised anomaly detection algorithm to generate, store, and/or otherwise produce one or more initial classifications, clusters, or the like for use in segmenting information, generating vulnerability indicators, and/or performing other functions described herein. The unsupervised anomaly detection algorithm may utilize the classifications, clusters, or the like to identify similarities between known zero-day vulnerabilities and information included in the input packets of network traffic information.

At step 202, the prediction platform 102 may train and/or otherwise configure a prediction model. For example, the prediction platform 102 may train and/or otherwise configure a prediction model to output suspicion scores (e.g., numerical values, grades, and/or other scores indicating a likelihood of a packet corresponding to, and/or being, a zero-day vulnerability) and behavior patterns (e.g., data structures, stored correlations, and/or other representations of characteristics of packets associated with zero-day vulnerabilities) based on input of packets of network traffic information. For example, the prediction platform 102 may train and/or otherwise configure the prediction model to implement an object recognition algorithm.

The object recognition algorithm may include multiple layers. Each layer may be configured to perform one or more steps for generating suspicion scores and/or behavior patterns based on input of packets of network traffic information. For example, the object recognition algorithm ay include an input layer, a pattern layer, an output layer, and/or other layers. An input layer may be and/or include one or more processes, steps, or the like configured to convert segments of network traffic information into numerical values. For example, the input layer may be configured to convert extracted packet information, preprocessed information, information of detected anomalies, and/or other information into a numerical representation of the information. In some examples, input layer may be configured to process, based on the numerical representations of the information, a suspicion score comprising a numerical value representing the cumulative information of each segment of network traffic information. The pattern layer may be configured to generate behavior patterns. For example, the pattern layer may be configured to generate behavior patterns based on segments of network traffic information converted by the input layer. The behavior patterns may be and/or include one or more data structures (e.g., vectors, tables, or the like), one or more stored correlations (e.g., in memory of the prediction platform 102), and/or other representations of patterns identified in the converted segments of network traffic information. The output layer may be configured to output, based on the behavior patterns, suspicion scores and behavior patterns. For example, the output layer may be configured to identify, based on comparing, counting, and/or otherwise analyzing elements of the behavior pattern and/or suspicion score, whether to output the suspicion score and behavior pattern for further training of the prediction model to improve its accuracy over time (e.g., as described further herein).

In some instances, to configure and/or otherwise train the prediction model as described herein, the prediction platform 102 may train and/or otherwise configure the prediction model to process, by implementing the object recognition algorithm, packets of network traffic information by applying natural language processing, natural language understanding, supervised machine learning techniques (e.g., regression, classification, neural networks, support vector machines, random forest models, naïve Bayesian models, and/or other supervised techniques), and/or other techniques. In some examples, the prediction platform 102 may train the prediction model using different machine learning techniques for different functions.

At step 203, the device 104 may capture packets. For example, the device 104 may capture packets of network traffic information by monitoring and/or intercepting network traffic of network 101 directed to or from a device associated with the enterprise organization corresponding to the device 104. In some examples, the device 104 may capture the packets of network traffic information by using an intrusion detection system. The intrusion detection system may be an application, process, or the like hosted by the device 104 that monitors network traffic for suspicious activity, known malicious threats (e.g., cyberattacks, or the like), and/or other threats to the network. The intrusion detection system (IDS) may be an anomaly-based IDS, a host-based IDS, a cloud-based IDS, and/or other types of IDS.

At step 204, the device 104 may filter the packets of network traffic information. For example, the device 104 may cause the IDS to filter the packets of network traffic information to isolate packets of network traffic information corresponding to potentially malicious information and/or activities. In filtering the packets of network traffic information, the device 104 may cause the IDS to use one or more detection methods. For example, the IDS may use signature-based detection to extract signatures corresponding to packets and identify, based on the signatures, whether the packets of network traffic information correspond to potentially malicious information and/or activities. Also or alternatively, the IDS may use anomaly-based detection methods. For example, the IDS may compare characteristics of a potentially malicious packet with a known or expected packet to identify anomalies in the potentially malicious packet. In some examples, in filtering the packets of network traffic information, the IDS may perform data extraction and/or preprocessing to convert the packets of network traffic information into a format for further analysis (e.g., by the object recognition algorithm). In some examples, the device 104 may be integrated with and/or managed by the prediction platform 102. It should be understood that, in these examples, the functions recited at step 203 and/or at step 204 may be performed by the prediction platform 102 (e.g., via the device 104).

Figure 2B:
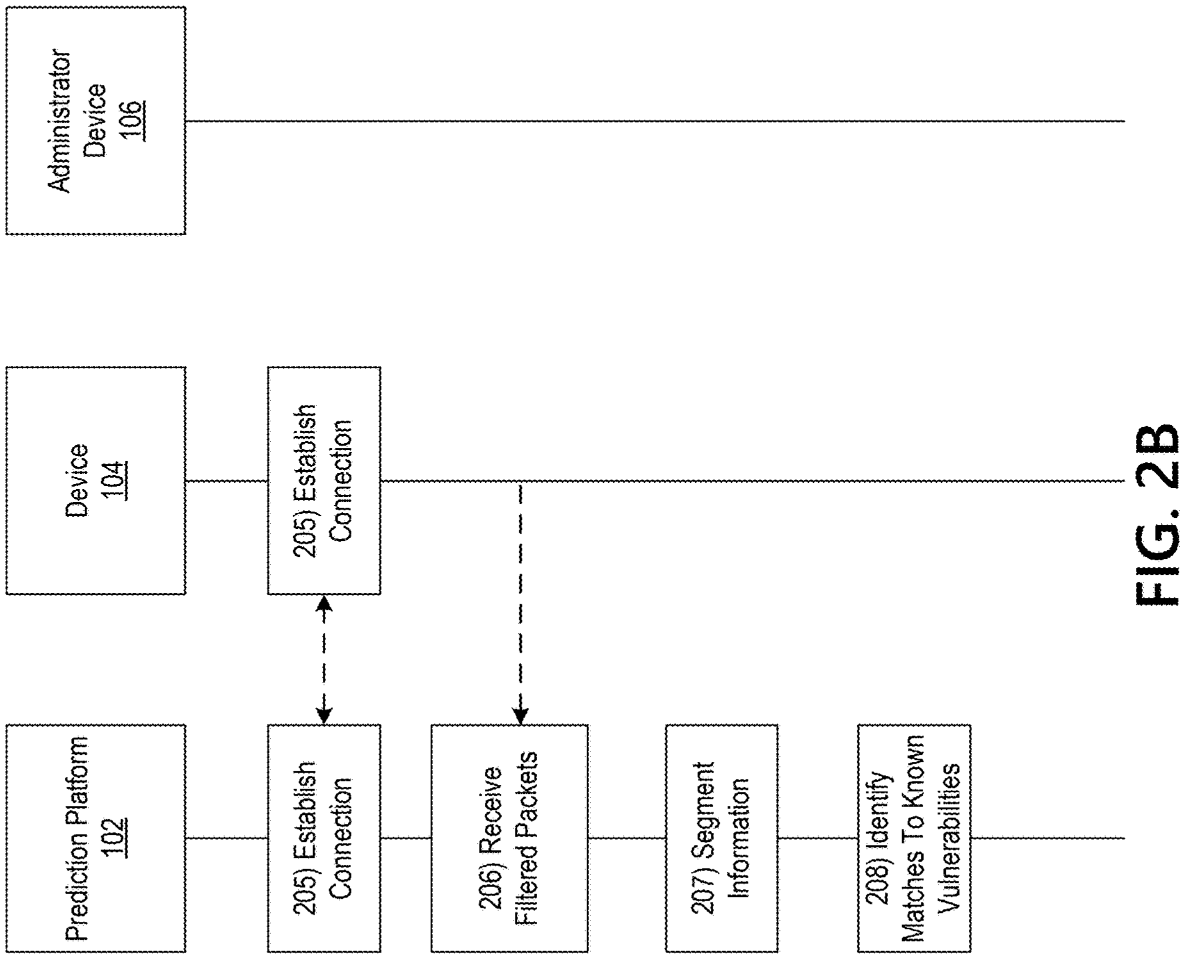

Referring to FIG. 2B, at step 205, the prediction platform 102 may establish a connection with the device 104. For example, the prediction platform 102 may establish a first wireless data connection with the device 104 to link the device 104 with the prediction platform 102 (e.g., in preparation for receiving filtered packets of network traffic information, and/or other functions). In some instances, the prediction platform 102 may identify whether or not a connection is already established with the device 104. If a connection is already established with the device 104, the prediction platform 102 might not re-establish the connection. If a connection is not yet established with the device 104, the prediction platform 102 may establish the first wireless data connection as described herein.

At step 206, the prediction platform 102 may receive filtered packets. For example, the prediction platform 102 may receive packets of network traffic filtered by the IDS. The prediction platform 102 may receive the filtered packets via the communication interface 113 and while the first wireless data connection is established. The filtered packets of network traffic information may comprise one or more sets of information extracted (e.g., by the IDS) from the packets of network traffic information received at step 203. In some examples, in receiving the filtered packets, the prediction platform 102 may additionally receive raw information. The raw information may be and/or include information from the packets of network traffic information, and/or a copy of the information from the packets of network traffic information, which has been extracted from the packets of network traffic information but which has not been preprocessed. In these examples, the prediction platform 102 may receive the filtered packets and the raw information as two separate representations of the same information. The filtered packets and the raw information received by the prediction platform 102 may, in some examples, comprise information only of packets identified by the IDS as suspicious.

At step 207, the prediction platform 102 may segment information. For example, the prediction platform 102 may segment each packet of the filtered packets (e.g., as received at step 206) into a plurality of different segments. In segmenting the information, the prediction platform 102 may label, categorize, cluster, and/or otherwise sort subsets of the information in the filtered packets of network traffic information into a plurality of segments. In some examples, each of the plurality of segments may be and/or include some or all of the same information in a different format. For example, a first segment may be formatted as raw information and a second segment may be formatted as processed information for input into an object recognition algorithm.

In segmenting the information (e.g., for a first packet of the plurality of packets), the prediction platform 102 may generate an information extraction segment. The information extraction segment may comprise information extracted from a first segment and/or from an IDS (e.g., the IDS of device 104). The prediction platform 102 may generate the information extraction segment by retrieving, pulling, and/or otherwise extracting information of the first packet and converting it into a format for further analysis. For example, the information may be converted from raw information into a format for comparing against information of known vulnerabilities, and/or other formats. In segmenting the information, the prediction platform 102 may also generate a preprocessed segment. In some examples, the preprocessed segment may comprise some or all of the information included in the information extraction segment in a different format. In some examples, the preprocessed segment may include information, of the first packet, different from the information of the information extraction segment. The prediction platform 102 may generate the preprocessed segment by preprocessing raw information (e.g., as received at step 206) to configure the raw information for input to the input layer of the object recognition algorithm. In some examples, in segmenting the information, the prediction platform 102 may also generate an anomaly detection segment. The anomaly detection segment may comprise unlabeled information corresponding to the first packet. For example, the anomaly detection segment may comprise some or all of the information of the first packet and additional real-time information related to anomaly detection. For example, the anomaly detection segment may comprise information of the first packet combined with information of known anomalies associated with the network 101.

In some examples, each of the information extraction segment, the preprocessed segment, and the anomaly detection segment may, in some examples, comprise overlapping information. For example, the information extraction segment may comprise at least one portion of the network traffic information of the first packet in a first format. The preprocessed segment may comprise the at least one portion of the network traffic information of the first packet in a second format. The anomaly detection segment may comprise the at least one portion of the network traffic information.

In some examples, the device 104 may have performed one or more steps of the segmenting information described above. For example, the device 104 may have used the IDS to extract information from the packets of network information, converted the extracted information from a first format to a second format, preprocessed the raw information of the packets of network information, and/or performed other functions recited above for step 207. In these examples, the prediction platform 102 may segment the information based on the segmentation performed by the device 104. For example, the prediction platform 102 may select, as the information extraction segment, the information extracted by the IDS and select, as the preprocessed segment, the information preprocessed by the IDS. In these examples, the prediction platform 102 may further segment the information by generating the anomaly detection segment as described above.

At step 208, the prediction platform 102 may identify matches to known vulnerabilities. For example, for a first packet, the prediction platform 102 may identify matches between the network traffic information of the first packet and known zero-day vulnerabilities based on the plurality of segments of the first packet (e.g., as described at step 207). The prediction platform 102 may identify whether the first packet matches a known zero-day vulnerability by comparing the plurality of segments with historical zero-day vulnerability information. The prediction platform 102 may compare the plurality of segments with historical zero-day vulnerability information in a database (e.g., vulnerability database 112*e*, or the like).

In some examples, to compare the plurality of segments with the historical zero-day vulnerability information, the prediction platform 102 may input, into the unsupervised anomaly detection algorithm, each segment of the plurality of segments. Because the historical zero-day vulnerability information was used to perform the initial training of the unsupervised anomaly detection algorithm, the unsupervised anomaly detection algorithm may be configured to perform the comparison. In some examples, by inputting the plurality of segments into the unsupervised anomaly detection algorithm, the prediction platform 102 may cause the unsupervised anomaly detection algorithm to identify matches between the information in the plurality of segments of the first packet and the historical zero-day vulnerability information by generating a vulnerability indicator. For example, by inputting each segment the plurality of segments into the unsupervised anomaly detection algorithm, the prediction platform 102 may cause the unsupervised anomaly detection algorithm to generate a vulnerability indicator comprising a likelihood of the first packet corresponding to a zero-day vulnerability.

The unsupervised anomaly detection algorithm may generate the vulnerability indicator by identifying, based on classifying, clustering, and/or otherwise analyzing, using one or more machine learning techniques, the information included in each segment of the plurality of segments. The unsupervised anomaly detection algorithm may generate a vulnerability indicator comprising a cumulative likelihood (e.g., an integer value, a percentage, a rating, and/or other indicator), based on each segment of the plurality of segments, of the first packet including information corresponding to a known zero-day vulnerability. In some examples, the vulnerability indicator may comprise a cumulative likelihood of the first packet including information corresponding to a known zero-day vulnerability for each known zero-day vulnerability in the historical zero-day vulnerability information. For example, if the known zero-day vulnerability information includes information of five known zero-day vulnerabilities, the prediction platform 102 may cause the unsupervised machine learning model to generate a vulnerability indicator with a different cumulative likelihood for each of the five known zero-day vulnerabilities. In some examples, one or more factors may cause the unsupervised anomaly detection algorithm to increase or decrease at least one cumulative likelihood of the vulnerability indicator. For example, the unsupervised anomaly detection model may also identify whether the information included in the plurality of segments corresponds to any anomalies and/or cyberthreats other than a zero-day vulnerability. If the unsupervised anomaly detection algorithm identifies that the anomaly detection segment includes information indicating that the packet is associated with a known anomaly other than a zero-day vulnerability, the anomaly detection algorithm may reduce/decrease the value of all cumulative likelihoods of the vulnerability indicator because it is less likely that the packet was identified as suspicious by the IDS based on any zero-day vulnerability (i.e., the IDS may have identified the packet as suspicious based on the known anomaly alone).

In these examples, the prediction platform 102 may identify whether the first packet matches a known zero-day vulnerability by comparing the vulnerability indicator a threshold likelihood. The threshold likelihood may be an integer, a percentage, a rating, and/or other value. The prediction platform 102 may compare the vulnerability indicator to the threshold likelihood by comparing each cumulative likelihood of the vulnerability indicator to the threshold likelihood. If the prediction platform 102 identifies that at least one cumulative likelihood meets or exceeds the threshold likelihood, the prediction platform 102 may identify that the vulnerability indicator meets or exceeds the threshold likelihood. If the prediction platform 102 identifies that the vulnerability indicator meets or exceeds the threshold likelihood, the prediction platform 102 may identify that the first packet matches a known zero-day vulnerability. In these examples, the prediction platform 102 may proceed to step 209. If the prediction platform 102 identifies that the vulnerability indicator does not meet or exceed the threshold likelihood, the prediction platform 102 may identify that the first packet does not match a known zero-day vulnerability. In these examples, the prediction platform 102 may proceed to step 211 without performing the functions recited at steps 209-210.

Figure 2C:
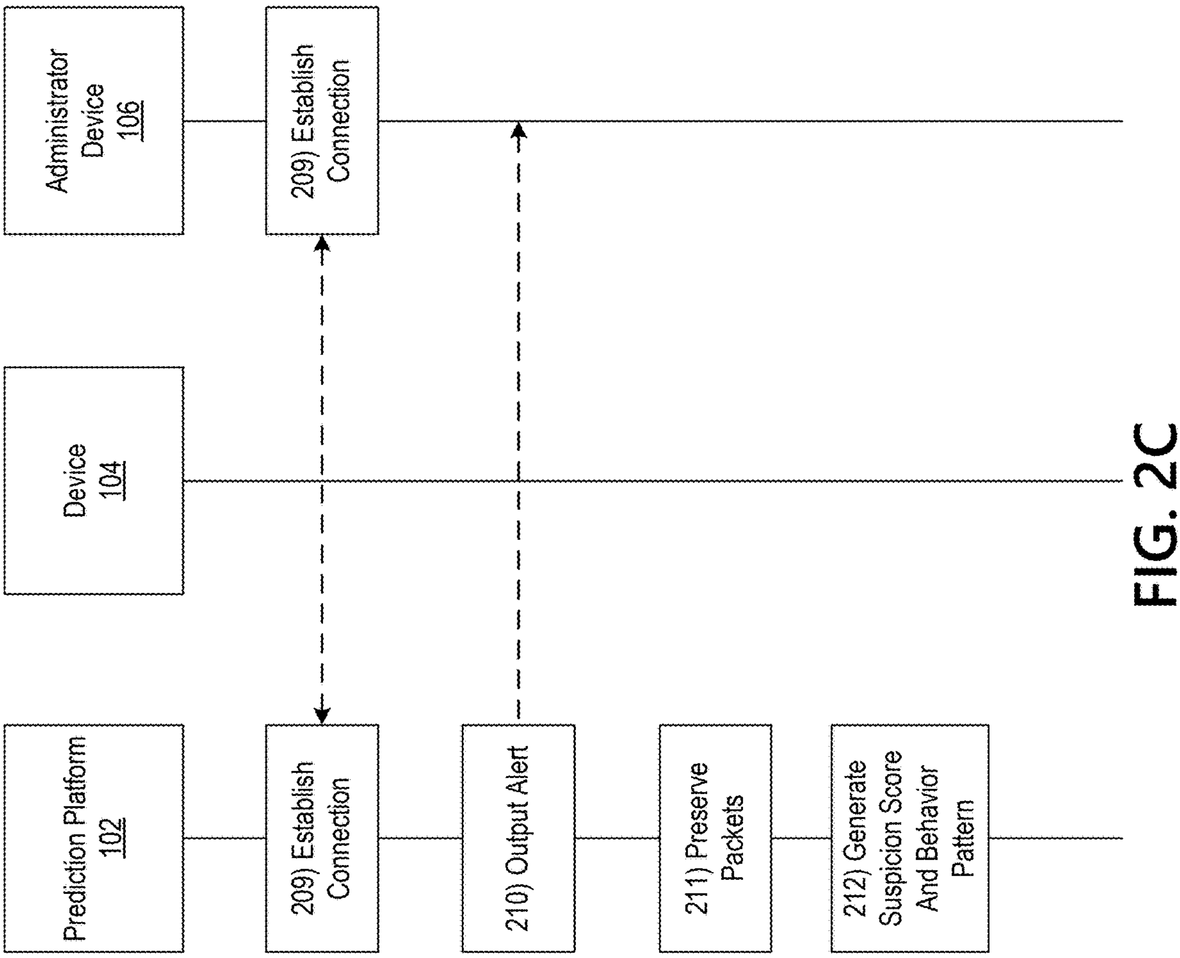

Referring to FIG. 2C, at step 209, the prediction platform 102 may establish a connection with the administrator device 106. For example, the prediction platform 102 may establish a second wireless data connection with the administrator device 106 to link the administrator device 106 with the prediction platform 102 (e.g., in preparation for outputting alerts, and/or other functions). In some instances, the prediction platform 102 may identify whether or not a connection is already established with the administrator device 106. If a connection is already established with the administrator device 106, the prediction platform 102 might not re-establish the connection. If a connection is not yet established with the administrator device 106, the prediction platform 102 may establish the second wireless data connection as described herein.

At step 210, the prediction platform 102 may output an alert. For example, the prediction platform 102 may send, via the communication interface 113 and while the second wireless data connection is established, the alert to the administrator device 106. The alert may comprise one or more instructions for the administrator device 106 to display, report, and/or otherwise output a security alert (e.g., to one or more security devices, security operations centers, and/or administrators associated with the network 101) indicating that the first packet matched a known zero-day vulnerability. In sending the alert, the prediction platform 102 may cause the administrator device 106 to respond to the alert (e.g., by implementing one or more known solutions to the known zero-day vulnerability). In some examples, based on outputting the alert, the prediction platform 102 may return to step 206 without performing the functions recited at steps 211-221 and receive additional packets to process for potential zero-day vulnerabilities At step 211, based on identifying that a packet does not match a known zero-day vulnerability, the prediction platform 102 may preserve the packet as a potential new zero-day vulnerability. For example, the prediction platform 102 may generate a suspicious packet identifier, identifying the packet as a potential zero-day vulnerability, for the packet. The suspicious packet identifier may comprise information preserving a current state of the packet, such as source information (e.g., .src information identifying the source IP address of a packet, or the like), protocol information identifying a protocol used to transmit the packet, a digital signature unique to the packet, and/or other information preserving the current state of the packet. In some examples, the prediction platform 102 may preserve the packet by storing (e.g., in vulnerability database 112*e*, or the like) the packet, and/or a copy of the packet, with the suspicious packet identifier. By preserving the packet, the prediction platform 102 may provide benefits by maintaining a record of packets (and information of the packets) that have been identified, by the unsupervised anomaly detection model, as not corresponding to a known zero-day vulnerability. The preserved packets may be used to improve the accuracy of the unsupervised anomaly detection model (e.g., by providing the preserved packets as additional unlabeled training inputs) if the packet is later identified as corresponding to a new zero-day vulnerability.

At step 212, the prediction platform 102 may generate a suspicion score and behavior pattern for a packet. For example, after preserving a packet, the prediction platform 102 may input the packet into the prediction model to cause the prediction model to output a suspicion score and a behavior pattern corresponding to the packet. The prediction platform 102 may input the packet into the prediction model by inputting, simultaneously or near-simultaneously, each segment of the plurality of segments of the packet. The prediction model may apply the object recognition algorithm to each segment of the plurality of segments. For example, based on the prediction platform 102 inputting the plurality of segments into the prediction model, the prediction model may initially push each segment of the plurality of segments to the input layer of the object recognition algorithm to convert the segments into numerical values. In some examples the object recognition algorithm may, at the input layer, convert cumulative information (e.g., the numerical values) from each segment of the packet into a single representation of the information. For example, the object recognition algorithm may be configured to convert the cumulative information from each segment of the packet into a suspicion score comprising a numerical value (e.g., an integer, a percentage, or the like) indicating a likelihood that the packet corresponds to a zero-day vulnerability.

As an example, the object recognition algorithm may convert information from one or more segments indicating that the packet was identified as suspicious into a first numerical value. For example, the object recognition algorithm may identify that the segments indicate the packet was flagged, by the IDS, as suspicious. The prediction platform 102 may cause the object recognition algorithm to generate a first numerical value of 1, corresponding to the indication that the packet was flagged by the IDS as suspicious. Also or alternatively, the object recognition algorithm may convert information from one or more segments indicating that the packet has been processed by the unsupervised anomaly detection algorithm without the unsupervised anomaly detection algorithm identifying an anomaly into a second numerical value. For example, the prediction platform 102 may cause the object recognition algorithm to generate a second numerical value of 0, corresponding to the indication that unsupervised anomaly detection algorithm did not identify an anomaly. Also or alternatively, the object recognition algorithm may convert information from one or more segments indicating that no cyberthreats other than potential zero-day vulnerabilities were associated with the packet. For example, the prediction platform 102 may cause the object recognition algorithm to generate a third numerical value of 1, corresponding to the indication that none of the segments indicated the packet was associated with a cyberthreat other than a potential zero-day vulnerability. Based on the first, second, and third numerical value, the object recognition algorithm may generate a suspicion score of 2, equal to the sum of the numerical values.

In some examples, the object recognition algorithm may utilize information from multiple packets to identify a given numerical value. For example, the object recognition algorithm implemented by the prediction platform 102 may identify that both the information extraction segment and the preprocessed segment indicate that the IDS flagged the packet as suspicious before generating the first numerical value as described above. In this way, the prediction platform 102 may offer advantages such as reducing or eliminating false alarms, by using the plurality of segments to confirm/double-check information before using it to generate a suspicion score. It should be understood that the above description of generating the suspicion score is merely an example and that other numerical values may be generated based on the same or different information of the segments without departing from the scope of this disclosure. Also or alternatively, the suspicion score need not be a numerical value and may be any other indicator or the like indicating that the object recognition algorithm recognized a potential zero-day vulnerability in the information of the packet.

To generate the behavior pattern, the prediction platform 102 may cause the object recognition algorithm of the prediction model to determine, at the pattern layer, a behavior pattern representative of information of the packet associated with a potential zero-day vulnerability. For example, the object recognition algorithm may generate, at the pattern layer and based on the numerical values from the input layer, the behavior pattern. In some examples, to generate the behavior pattern, the prediction model may cause the pattern layer of the object recognition algorithm to employ one or more scoring constraints/parameters. As an example, the prediction model may execute the object recognition algorithm using the following constraints/parameters:

Y1=1 if segments indicate the IDS flagged packet;

Y1=0 if segments indicate the IDS did not flag packet;

Y2=1 if segments indicate the unsupervised anomaly detection algorithm identified an unknown anomaly;

Y2=0 if segments indicate the unsupervised anomaly detection did not detect an unknown anomaly;

Y3=1 if segments indicate a known anomaly other than a potential zero-day vulnerability was not detected; and Y3=0 if segments indicate a known anomaly other than a potential zero-day vulnerability was detected.

In the above example, the prediction model may cause object recognition algorithm to generate a behavior pattern of Y1=1, Y2=1, and Y3=0 based on information in the segments indicating that the IDS flagged the packet, the unsupervised anomaly detection algorithm identified an unknown anomaly, and a known anomaly other than a potential zero-day vulnerability was also detected (e.g., by the IDS and/or by the unsupervised anomaly detection algorithm). It should be understood that the above behavior pattern is merely an example and that the prediction platform 102 may generate, via the prediction model and object recognition algorithm, behavior patterns comprising different representations of different traits, parameters, or the like associated with information in the segments of the packet without departing from the scope of this disclosure.

Figure 2D:
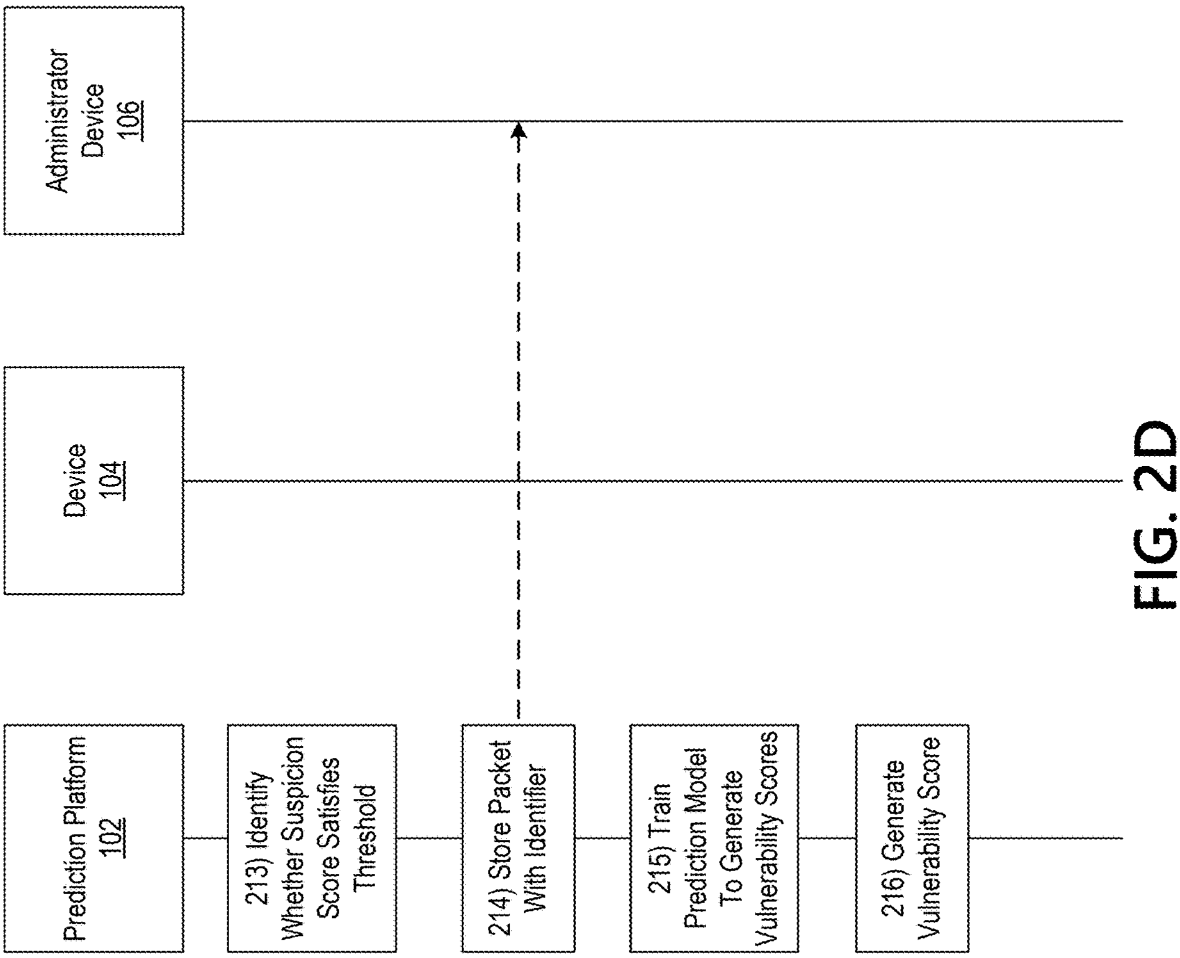

Referring to FIG. 2D, at step 213, the prediction platform 102 may identify whether the suspicion score satisfies a threshold. For example, the prediction platform 102 may cause the object recognition algorithm of the prediction model to identify whether the suspicion score satisfies a predetermined threshold score at the output layer of the object recognition algorithm. In identifying whether the suspicion score satisfies the threshold score the prediction platform 102 may cause the object recognition algorithm of the prediction model to compare the suspicion score to the threshold score. If the suspicion score meets or exceeds the threshold score, the prediction platform 102 may identify that the suspicion score satisfies the threshold score. If the suspicion score does not meet or exceed the threshold score, the prediction platform 102 may identify that the suspicion score does not satisfy the threshold score. Based on identifying that the suspicion score satisfies the threshold score, the prediction platform 102 may, via the output layer, output the suspicion score and behavior pattern for further training of the prediction model at step 215 without performing the functions recited at step 214. Based on identifying that the suspicion score does not satisfy the threshold score the prediction platform 102 may proceed to step 214 and store the packet corresponding to the behavior pattern and suspicion score.

At step 214, based on identifying that the suspicion score does not satisfy the threshold score, the prediction platform 102 may store the packet with a suspicious packet identifier. For example, the prediction platform 102 may store the packet with the suspicious packet identifier generated to preserve the packet. The prediction platform 102 may store the packet with the suspicious identifier at the administrator device 106. For example, the prediction platform 102 may send the packet with the suspicious packet identifier while the second wireless data connection is established. If the second wireless data connection is not established, the prediction platform 102 may establish the second wireless data connection as described at step 209. Storing the packet with the suspicious packet identifier allows the packet to be used in additional cybersecurity operations (e.g., as an example of a suspicious packet that is not associated with a zero-day vulnerability), such as other operations involving the IDS. In this way, the prediction platform 102 may improve security of the entire network 101.

At step 215, based on identifying that the suspicion score satisfies the threshold score, the prediction platform 102 may train the prediction model based on the behavior pattern. For example, the prediction platform 102 may train the prediction model to generate vulnerability scores based on the behavior pattern. A vulnerability score may comprise a value (e.g., an integer, percentage, or the like) corresponding to a prediction of whether a packet is potentially associated with a zero-day vulnerability. To train the prediction model, the prediction platform 102 may provide the behavior pattern as an additional training set. The prediction platform 102 may train the model using one or more machine learning techniques. For example, the prediction platform 102 may cause the prediction model to store one or more correlations between the behavior pattern and known zero-day vulnerabilities. In some examples, the prediction platform 102 may cause the prediction model to store a correlation between the behavior pattern and a known zero-day vulnerability associated with one or more portions of the behavior pattern. For example, based on the example behavior pattern of Y1=1, Y2=1, and Y3=0, the prediction platform 102 may cause the prediction model to store correlations between the behavior pattern and any known zero-day vulnerabilities corresponding to behavior patterns of at least Y1=1, and Y2=1.

In training the prediction model based on the behavior pattern, the prediction platform 102 may train the prediction model to generate vulnerability scores by learning the behavior pattern and using the behavior pattern to identify a likelihood of packets with similar behavior patterns being associated with a zero-day vulnerability. For example, the prediction platform 102 may train the prediction model to generate vulnerability scores based on the stored correlations, associations, or the like between behavior patterns and known zero-day vulnerabilities. The prediction model may be trained to increase the vulnerability score for a packet for each known zero-day vulnerability that is associated with the behavior pattern of the packet. For instance, the prediction platform 102 may train the prediction model to increase a vulnerability score of a given packet, from a base level of 0%, by an increment of 5% for each known zero-day vulnerability associated and/or correlated with the behavior pattern of the given packet. Training the prediction model based on the behavior pattern may also refine and/or otherwise update the prediction model to improve its ability to identify potential zero-day vulnerabilities by providing a larger sample size of behavior patterns to use in generating vulnerability scores.

It should be understood that the training of the prediction model may be repeated continuously or near-continuously, based on behavior scores generated by the prediction platform 102 for one or more additional packets using the methods described herein, to further refine the prediction model. For example, over a period of time the prediction platform 102 may train the prediction model based on any number of packets of network traffic information segmented by the prediction platform 102 and analyzed by the object recognition algorithm and unsupervised anomaly detect algorithm as described herein.

At step 216, based on training the prediction model to generate vulnerability scores, the prediction platform 102 may generate a vulnerability score for a packet. The packet may be a packet the prediction platform 102 previously generated a behavior pattern for and used to train the prediction model based on the functions recited at steps 201-215 as described herein. To generate the vulnerability score, the prediction platform 102 may input the behavior pattern of the packet into the prediction model for analysis. The prediction model may, in some examples, compare the behavior pattern of the packet to the behavior patterns of a plurality of packets previously provided to the prediction model (e.g., as training data) to identify a likelihood that the packet corresponds to a zero-day vulnerability. For example, based on comparing the behavior pattern of the packet to a behavior pattern associated with a known zero-day vulnerability, the prediction platform 102 may cause the prediction model to generate a vulnerability score based on the similarity of the behavior pattern of the packet and the behavior pattern associated with a known zero-day vulnerability. For example, if the behavior pattern of the packet and the behavior pattern associated with a known zero-day vulnerability share, for example, two out of three elements (e.g., Y1,Y2) and do not share a third element (e.g., Y3), the prediction model may generate a vulnerability score of 66.67%. It should be understood that the vulnerability score described above is merely an example and that other vulnerability scores, based on other similarities between behavior patterns, may be generated without departing from the scope of this disclosure.

Figure 2E:
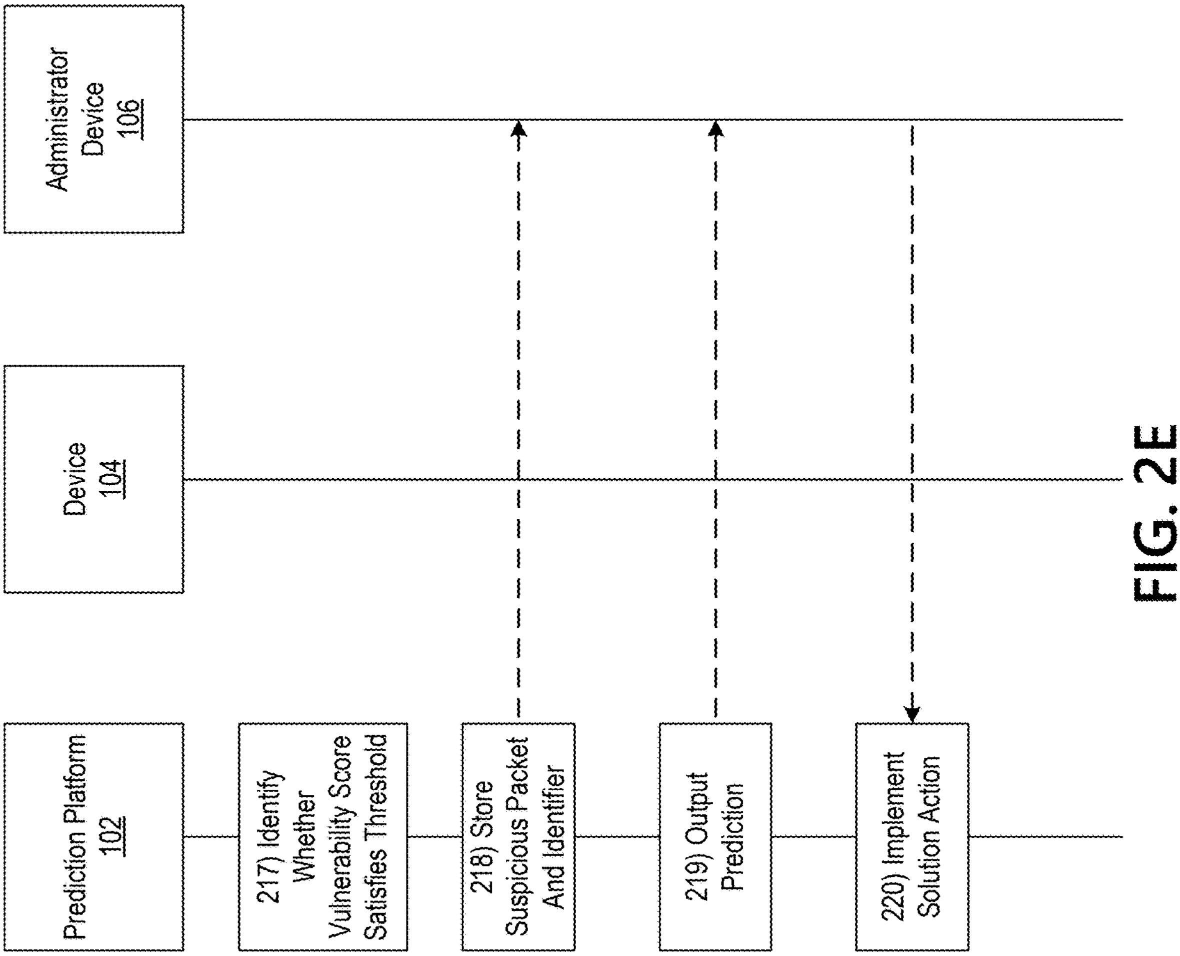

Referring to FIG. 2E, at step 217, the prediction platform 102 may identify whether the vulnerability score satisfies a threshold score. For example, the prediction platform 102 may compare the vulnerability score to a predetermined threshold score to identify whether the vulnerability score meets or exceeds the threshold score. The threshold score may be a predetermined value set by an administrator machine or individual that, if satisfied, indicates the risk of a packet being associated with a zero-day vulnerability exceeds an acceptable tolerance. If the vulnerability score meets or exceeds the threshold score, the prediction platform 102 may proceed to step 219 to output a zero-day vulnerability prediction. If the vulnerability score does not meet or exceed the threshold score, the prediction platform 102 may proceed to step 218 and store the packet with a suspicious packet identifier.

At step 218, based on identifying that the vulnerability score does not meet or exceed the threshold score, the prediction platform 102 may store the packet with a suspicious packet identifier. For example, the prediction platform 102 may store the packet with the suspicious packet identifier generated to preserve the packet. The prediction platform 102 may store the packet with the suspicious identifier at the administrator device 106. For example, the prediction platform 102 may send the packet with the suspicious packet identifier while the second wireless data connection is established. If the second wireless data connection is not established, the prediction platform 102 may establish the second wireless data connection as described at step 209. Storing the packet with the suspicious packet identifier allows the packet to be used in additional cybersecurity operations (e.g., as an example of a suspicious packet that is not associated with a predicted zero-day vulnerability), such as other operations involving the IDS. In this way, the prediction platform 102 may improve security of the entire network 101.

At step 219, based on identifying that the vulnerability score meets or exceeds the threshold score, the prediction platform 102 may output a prediction. For example, the prediction platform 102 may output a zero-day vulnerability prediction indicating a likelihood that a packet is associated with, and/or will cause, a zero-day vulnerability. The zero-day vulnerability prediction may comprise additional information. For example, the prediction platform 102 may generate and output a vulnerability prediction comprising information corresponding to the known zero-day vulnerabilities associated with behavior patterns that the behavior pattern of the packet was compared with. In these examples, the zero-day vulnerability information may comprise one or more of: an indication of a source of a predicted zero-day vulnerability (e.g., an IP address associated with the packet, a device identifier associated with the packet, a communication protocol associated with the packet, or the like), an indication of a type of threat associated with the predicted zero-day vulnerability (e.g., an operating system vulnerability, a ransomware attack, or the like), an indication of a solution action associated with a predicted zero-day vulnerability (e.g., a solution action, such as a patch, application, packet filtering rule, or the like associated with a known zero-day vulnerability similar to the predicted zero-day vulnerability), and/or other information.

Figure 3:
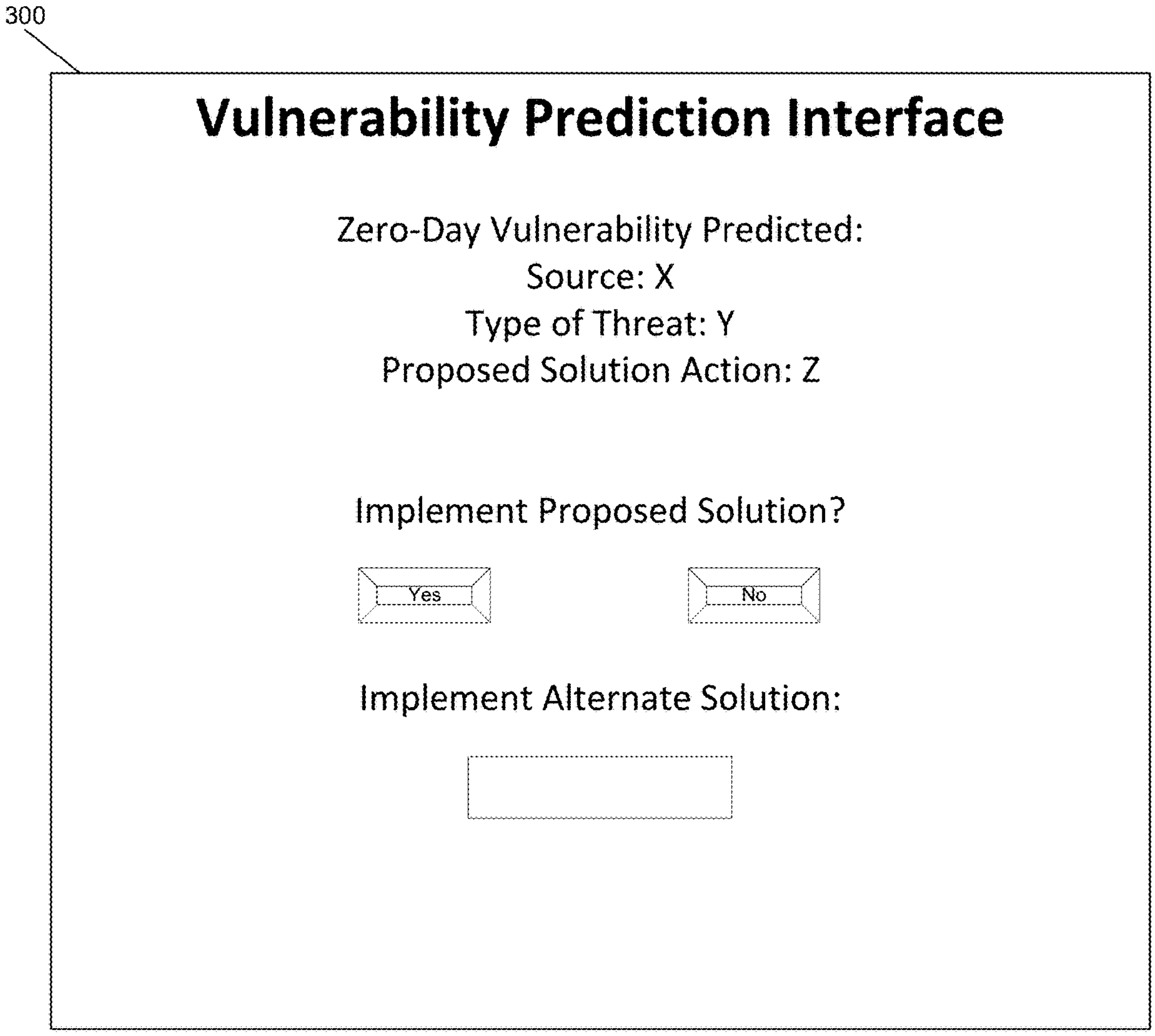
FIG. 3 depicts an illustrative graphical user interface generated as part of predicting zero-day vulnerabilities using anomaly detection and neural network algorithms in accordance with one or more example arrangements.

In some examples, in outputting the zero-day vulnerability prediction, the prediction platform 102 may send the zero-day vulnerability prediction to the administrator device 106. For example, the prediction platform 102 may send the zero-day vulnerability prediction while the second wireless data connection is established. If the second wireless data connection is not established, the prediction platform 102 may establish the second wireless data connection as described at step 209. In some examples, in outputting the zero-day vulnerability prediction, the prediction platform 102 may cause output of and/or otherwise display a user interface. In some examples, in causing output of the user interface, the prediction platform 102 may transmit and cause display of a vulnerability prediction interface for notifying a user (e.g., an administrator of the enterprise organization associated with the prediction platform 102, a user associated with the SOC and/or other cybersecurity elements of the network 101, and/or other users) of the predicted zero-day vulnerability. In displaying the vulnerability prediction interface, the prediction platform 102 may cause display of a graphical user interface similar to vulnerability prediction interface 300, which is illustrated in FIG. 3. For example, the prediction platform 102 may output one or more instructions (via the communication interface 113 and while the second wireless data connection is established) to the administrator device 106, causing the administrator device 106 to display the vulnerability prediction interface 300.

Referring to FIG. 3, in some instances, the vulnerability prediction interface 300 may include information corresponding to the zero-day vulnerability prediction. For example, the vulnerability prediction interface 300 may include information such as an indication of the source of the predicted zero-day vulnerability, an indication of the type of threat associated with the predicted zero-day vulnerability, an indication of a proposed solution action associated with the predicted zero-day vulnerability, and/or other information. The vulnerability prediction interface 300 may also display interface elements or selectable options requesting user input. For example, the vulnerability prediction interface 300 may display one or more of: an information entry field, a button or buttons, toggle or toggles, check box or boxes, and/or other interface elements. For example, as illustrated in FIG. 3, the interface elements may be one or more buttons the user might toggle or select to provide feedback and/or a data entry field for a user to enter information (e.g., a solution action for the prediction platform 102 to implement). In some instances, based on a user selecting the toggle to provide user feedback, the user may be prompted to input the feedback (e.g., a solution action for the prediction platform 102 to implement that will resolve the zero-day vulnerability). In these examples, the administrator device 106 may provide the feedback to the prediction platform 102 and the prediction platform 102 may receive the user input/feedback (e.g., as described herein with respect to step 220).

Referring again to FIG. 2E, at step 220, the prediction platform 102 may implement a solution action. In implementing the solution action, the prediction platform 102 may identify a solution action. For example, the prediction platform 102 may have one or more preconfigured instructions (e.g., in memory 112) indicating solution actions for addressing one or more known zero-day vulnerabilities. In these examples, the prediction platform 102 may identify a solution action based on a similarity between the zero-day vulnerability prediction and a known zero-day vulnerability. In some examples, the prediction platform 102 may identify the solution action based on feedback received from the administrator device 106 (e.g., in response to outputting the zero-day vulnerability prediction at step 219). For example, the prediction platform 102 may receive from the administrator device 106 (e.g., in response to causing display of a vulnerability prediction interface 300, or the like). The feedback may be and/or include instructions directing the prediction platform 102 to implement one or more solution actions (e.g., packet filtering rules, software patches or updates, or the like) configured to address the predicted zero-day vulnerability. The prediction platform 102 may implement the identified solution action. For example, the prediction platform 102 may cause the one or more processors 111 to execute the instructions for the identified solution action.

Figure 2F:
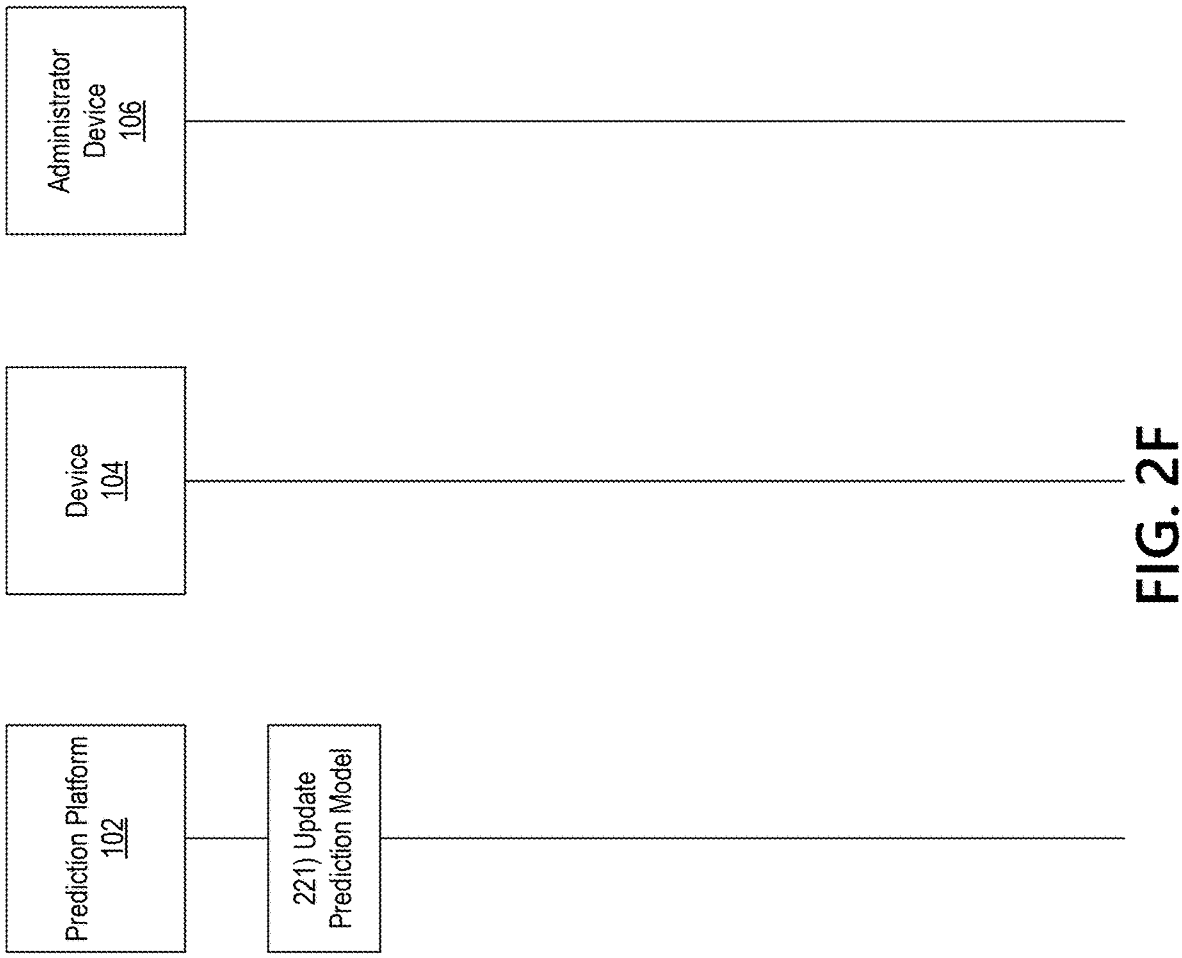

Referring to FIG. 2F, at step 221, the prediction platform 102 may refine, validate, and/or otherwise update the prediction model. For example, the prediction platform 102 may update the prediction model by providing the zero-day vulnerability prediction as input into the prediction model based on feedback received from the administrator device 106 indicating whether the predicted zero-day vulnerability accurately predicted a zero-day vulnerability. The prediction model may use neural network techniques to modify its behaviors, algorithms, or the like based on the information of the zero-day vulnerability prediction. By inputting the zero-day vulnerability prediction into the prediction model, the prediction platform 102 may create and/or update an iterative feedback loop that may continuously and dynamically refine the prediction model to improve its accuracy in generating vulnerability scores. In some instances, updating the prediction model may include causing the prediction model to update or add one or more stored correlations. For example, the prediction platform 102 may cause the prediction model to store new correlations and/or update existing correlations such that the prediction model may generate vulnerability scores, based on behavior patterns indicating the same or similar behavior as the behavior pattern which produced the zero-day vulnerability prediction, in future iterations of the feedback loop.

In updating the prediction model, the prediction platform 102 may improve the accuracy of the model for generating vulnerability scores and thus producing predictions of zero-day vulnerabilities which may, for example, result in more efficient training of machine learning models trained by the prediction platform 102 (and may in some instances, conserve computing and/or processing power/resources in doing so). The improvements to the accuracy of the model may also provide improvements to the security of the network 101 by increasing the likelihood of the prediction model successfully predicting a zero-day vulnerability in advance.

Figure 4:
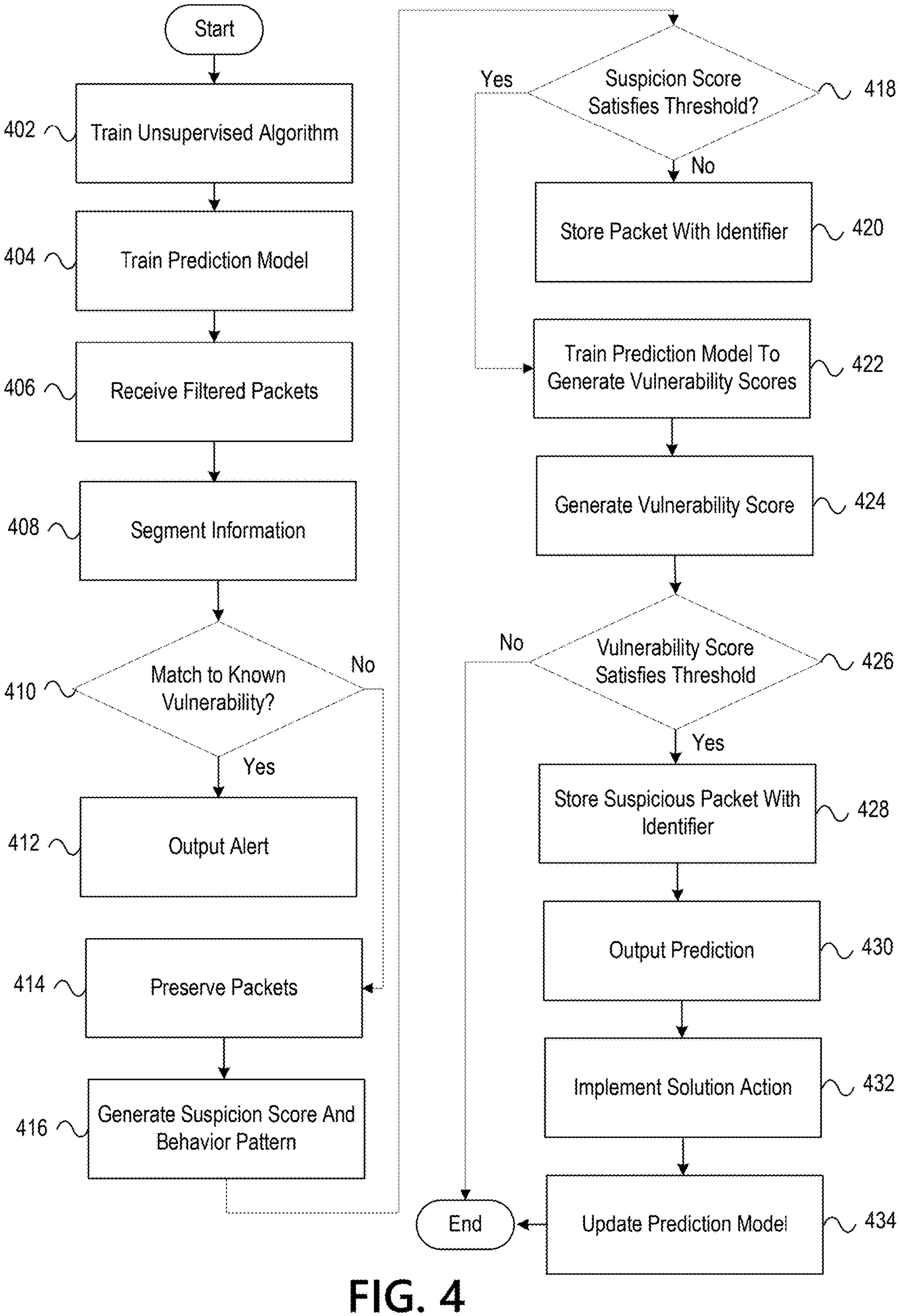
FIG. 4 depicts an illustrative method for predicting zero-day vulnerabilities using anomaly detection and neural network algorithms in accordance with one or more example arrangements.

FIG. 4 depicts an illustrative method for predicting zero-day vulnerabilities using anomaly detection and neural network algorithms in accordance with one or more example arrangements. Referring to FIG. 4, at step 402, a computing platform having at least one processor, a communication interface, and memory may train an unsupervised algorithm. For example, the computing platform may train an unsupervised anomaly detection algorithm to generate vulnerability indicators based on input of packets of network traffic information. At step 404, the computing platform may train a prediction model. For example, the prediction platform 102 may train a prediction model, using a neural network algorithm such as an object recognition algorithm, to output suspicion scores and behavior patterns based on input of packets of network traffic information. At step 406, the computing platform may receive filtered packets. For example, the computing platform may receive filtered packets of network traffic information from an IDS. At step 408, the computing platform may segment information of the filtered packets into one or more segments. At step 410, based on the segmented information, the computing platform may identify whether a packet matches a known zero-day vulnerability. For example, the computing platform may identify whether the packet matches a known zero-day vulnerability using the unsupervised algorithm.

At step 412, based on identifying that a packet does match a known zero-day vulnerability, the computing platform may output an alert (e.g., to an SOC). At step 414, based on identifying that a packet does not match a known zero-day vulnerability, the computing platform may preserve the packet. At step 416, the computing platform may generate a suspicion score and a behavior pattern for a packet. For example, the computing platform may generate the suspicion score and the behavior pattern based on inputting the packet into the prediction model. At step 418, the computing platform may identify whether the suspicion score satisfies a threshold.

At step 420, based on identifying that the suspicion score does not satisfy the threshold, the computing platform may store the packet with an identifier. For example, the computing platform may store the packet with an identifier associated with the packet when the packet was preserved. At step 422, based on identifying that the suspicion score does satisfy the threshold, the computing platform may train the prediction model to generate vulnerability scores. For example, the computing platform may train the prediction model based on inputting the behavior pattern into the prediction model as training data. At step 424, the computing platform may generate a vulnerability score for a packet. At step 426, the computing platform may identify whether the vulnerability score satisfies a threshold. At step 428, based on identifying that the vulnerability score does satisfy the threshold, the computing platform may identify that the packet is suspicious and store the suspicious packet with an identifier. At step 430, the computing platform may output a prediction. For example, the computing platform may output a zero-day vulnerability prediction indicating a potential zero-day vulnerability. At step 432, the computing platform may implement a solution action for the potential zero-day vulnerability. At step 434, the computing platform may update the prediction model. For example, the computing platform may update the prediction model based on the zero-day vulnerability prediction.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
- at least one processor;
- a communication interface communicatively coupled to the at least one processor; and
- memory storing computer-readable instructions that, when executed by the at least one processor, configure the computing platform to:
  - train, based on an object recognition algorithm, a prediction model to output suspicion scores and behavior patterns based on input of packets of network traffic information;
  - receive a plurality of packets of network traffic information filtered by an intrusion detection system;
  - segment information, of a first packet of the plurality of packets, into a plurality of segments;
  - identify, by comparing the plurality of segments with historical zero-day vulnerability information, whether the first packet matches a known zero-day vulnerability, and in response:
    - based on identifying that the first packet matches a known zero-day vulnerability, output a security alert; and
    - based on identifying that the first packet does not match a known zero-day vulnerability, preserve the first packet as a potential new zero-day vulnerability;
  - generate, based on preserving the first packet and by inputting the first packet into the prediction model, a suspicion score for the first packet and a behavior pattern for the first packet;
  - identify whether the suspicion score for the first packet satisfies a threshold score, and in response:
    - based on identifying that the suspicion score for the first packet satisfies the threshold score, train, based on the behavior pattern for the first packet, the prediction model to generate vulnerability scores for packets of network traffic information; and
    - based on identifying that the suspicion score for the first packet does not satisfy the threshold score, store the first packet with a suspicious packet identifier;
  - generate, by inputting a second packet of the plurality of packets into the prediction model, a vulnerability score for the second packet; and
  - output, based on the vulnerability score for the second packet, a zero-day vulnerability prediction.

2. The computing platform of claim 1, wherein the memory stores additional computer-readable instructions that, when executed by the at least one processor, configure the computing platform to:
- train, based on the historical zero-day vulnerability information, an unsupervised anomaly detection algorithm to generate vulnerability indicators based on input of packets of network traffic information; and
- generate, based on the plurality of segments and using the unsupervised anomaly detection algorithm, a vulnerability indicator for the first packet indicating a likelihood of the first packet corresponding to a known zero-day vulnerability,
- wherein the instructions, when executed by the one or more processors, configure the computing platform to identify whether the first packet matches a known zero-day vulnerability by comparing the vulnerability indicator to a threshold likelihood, and in response:
  - based on identifying that the vulnerability indicator meets or exceeds the threshold likelihood, identify that the first packet matches a known zero-day vulnerability, or
  - based on identifying that the vulnerability indicator does not meet or exceed the threshold likelihood, identify that the first packet does not match a known zero-day vulnerability.

3. The computing platform of claim 1, wherein the object recognition algorithm comprises:
- an input layer configured to convert segments of network traffic information into numerical values;
- a pattern layer configured to generate, based on the converted segments of network traffic information, the behavior patterns; and an output layer configured to output, based on the behavior patterns, the suspicion scores and the behavior patterns.

4. The computing platform of claim 1, wherein the historical zero-day vulnerability information comprises one or more of:

information indicating a location of a historical zero-day vulnerability, information indicating a behavior pattern associated with a historical zero-day vulnerability, or information indicating a type of threat associated with a historical zero-day vulnerability.

5. The computing platform of claim 1, wherein the instructions, when executed by the one or more processors, configure the computing platform to preserve the first packet by generating the suspicious packet identifier for the first packet.

6. The computing platform of claim 1, wherein the memory stores additional computer-readable instructions that, when executed by the at least one processor, configure the computing platform to:

identify, based on outputting the zero-day vulnerability prediction, a solution action for the zero-day vulnerability prediction;

implement, based on identifying the solution action, the solution action; and update, based on the zero-day vulnerability prediction, the prediction model.

7. The computing platform of claim 1, wherein the instructions, when executed by the one or more processors, configure the computing platform to segment the information of the first packet by:

generating, by converting the network traffic information filtered by the intrusion detection system from a first format to a second format configured for the object recognition algorithm, a first segment of the plurality of segments; and generating, by preprocessing raw network traffic information and converting it to the second format, a second segment of the plurality of segments.

8. The computing platform of claim 1, wherein the instructions, when executed by the one or more processors, configure the computing platform to output the zero-day vulnerability prediction by:

causing display, at a user device, of a user interface comprising the zero-day vulnerability prediction.

9. The computing platform of claim 1, wherein the zero-day vulnerability prediction comprises one or more of:

an indication of a source of a predicted zero-day vulnerability, an indication of a type of threat associated with a predicted zero-day vulnerability, or an indication of a solution action associated with a predicted zero-day vulnerability.

10. The computing platform of claim 1, wherein the memory stores additional computer-readable instructions that, when executed by the at least one processor, configure the computing platform to:

identify, by comparing the vulnerability score for the second packet to a second threshold score, whether the vulnerability score for the second packet satisfies the second threshold score; and generate, based on identifying whether the vulnerability score for the second packet satisfies the second threshold score, the zero-day vulnerability prediction.

11. A method comprising:

at a computing device comprising at least one processor, a communication interface, and memory:

training, based on an object recognition algorithm, a prediction model to output suspicion scores and behavior patterns based on input of packets of network traffic information;

receiving a plurality of packets of network traffic information filtered by an intrusion detection system;

segmenting information, of a first packet of the plurality of packets, into a plurality of segments;

identifying, by comparing the plurality of segments with historical zero-day vulnerability information, whether the first packet matches a known zero-day vulnerability, and in response:

based on identifying that the first packet matches a known zero-day vulnerability, outputting a security alert; and based on identifying that the first packet does not match a known zero-day vulnerability, preserving the first packet as a potential new zero-day vulnerability;

generating, based on preserving the first packet and by inputting the first packet into the prediction model, a suspicion score for the first packet and a behavior pattern for the first packet;

identifying whether the suspicion score for the first packet satisfies a threshold score, and in response:

based on identifying that the suspicion score for the first packet satisfies the threshold score, training, based on the behavior pattern for the first packet, the prediction model to generate vulnerability scores for packets of network traffic information; and based on identifying that the suspicion score for the first packet does not satisfy the threshold score, storing the first packet with a suspicious packet identifier;

generating, by inputting a second packet of the plurality of packets into the prediction model, a vulnerability score for the second packet; and outputting, based on the vulnerability score for the second packet, a zero-day vulnerability prediction.

12. The method of claim 11, further comprising:

training, based on the historical zero-day vulnerability information, an unsupervised anomaly detection algorithm to generate vulnerability indicators based on input of packets of network traffic information; and generating, based on the plurality of segments and using the unsupervised anomaly detection algorithm, a vulnerability indicator for the first packet indicating a likelihood of the first packet corresponding to a known zero-day vulnerability, wherein the identifying whether the first packet matches a known zero-day vulnerability comprises comparing the vulnerability indicator to a threshold likelihood, and in response:

based on identifying that the vulnerability indicator meets or exceeds the threshold likelihood, identifying that the first packet matches a known zero-day vulnerability, or based on identifying that the vulnerability indicator does not meet or exceed the threshold likelihood, identifying that the first packet does not match a known zero-day vulnerability.

13. The method of claim 11, wherein the object recognition algorithm comprises:

an input layer configured to convert segments of network traffic information into numerical values;

a pattern layer configured to generate, based on the converted segments of network traffic information, the behavior patterns; and an output layer configured to output, based on the behavior patterns, the suspicion scores and the behavior patterns.

14. The method of claim 11, wherein the historical zero-day vulnerability information comprises one or more of:

information indicating a location of a historical zero-day vulnerability, information indicating a behavior pattern associated with a historical zero-day vulnerability, or information indicating a type of threat associated with a historical zero-day vulnerability.

15. The method of claim 11, wherein the preserving the first packet comprises generating the suspicious packet identifier for the first packet.

16. The method of claim 11, further comprising:

identifying, based on outputting the zero-day vulnerability prediction, a solution action for the zero-day vulnerability prediction;

implementing, based on identifying the solution action, the solution action; and updating, based on the zero-day vulnerability prediction, the prediction model.

17. The method of claim 11, wherein the segmenting the information of the first packet comprises:

generating, by converting the network traffic information filtered by the intrusion detection system from a first format to a second format configured for the object recognition algorithm, a first segment of the plurality of segments; and generating, by preprocessing raw network traffic information and converting it to the second format, a second segment of the plurality of segments.

18. The method of claim 11, wherein the outputting the zero-day vulnerability prediction comprises:

causing display, at a user device, of a user interface comprising the zero-day vulnerability prediction.

19. The method of claim 11, wherein the zero-day vulnerability prediction comprises one or more of:

an indication of a source of a predicted zero-day vulnerability, an indication of a type of threat associated with a predicted zero-day vulnerability, or an indication of a solution action associated with a predicted zero-day vulnerability.

20. One or more non-transitory computer-readable media storing instructions that, when executed by a computing platform comprising at least one processor, a communication interface, and memory, configure the computing platform to:

train, based on an object recognition algorithm, a prediction model to output suspicion scores and behavior patterns based on input of packets of network traffic information;

receive a plurality of packets of network traffic information filtered by an intrusion detection system;

segment information, of a first packet of the plurality of packets, into a plurality of segments;

identify, by comparing the plurality of segments with historical zero-day vulnerability information, whether the first packet matches a known zero-day vulnerability, and in response:

based on identifying that the first packet matches a known zero-day vulnerability, output a security alert; and based on identifying that the first packet does not match a known zero-day vulnerability, preserve the first packet as a potential new zero-day vulnerability;

generate, based on preserving the first packet and by inputting the first packet into the prediction model, a suspicion score for the first packet and a behavior pattern for the first packet;

identify whether the suspicion score for the first packet satisfies a threshold score, and in response:

based on identifying that the suspicion score for the first packet satisfies the threshold score, train, based on the behavior pattern for the first packet, the prediction model to generate vulnerability scores for packets of network traffic information; and based on identifying that the suspicion score for the first packet does not satisfy the threshold score, store the first packet with a suspicious packet identifier;

generate, by inputting a second packet of the plurality of packets into the prediction model, a vulnerability score for the second packet; and output, based on the vulnerability score for the second packet, a zero-day vulnerability prediction.

* * * * *